United States Patent [19]

Inoue et al.

[11] Patent Number: 4,918,035
[45] Date of Patent: Apr. 17, 1990

[54] PROCESS FOR THE PREPARATION OF COMPLEX PEROVSKITE TYPE COMPOUNDS

[75] Inventors: Osamu Inoue, Kadoma; Syunichiro Kawashima, Nishinomiya, both of Japan

[73] Assignee: Matsushita Electric Industrial Co., Ltd., Osaka, Japan

[21] Appl. No.: 373,700

[22] Filed: Jun. 30, 1989

Related U.S. Application Data

[63] Continuation of Ser. No. 24,630, Mar. 11, 1987, abandoned.

[30] Foreign Application Priority Data

Mar. 14, 1986 [JP] Japan ................. 61-57209
Jun. 2, 1986 [JP] Japan ................. 61-127559
Jun. 2, 1986 [JP] Japan ................. 61-127560

[51] Int. Cl.$^4$ ............................................ C04B 35/00
[52] U.S. Cl. ................................. 501/135; 501/134; 502/252; 423/593; 423/594
[58] Field of Search ............... 501/134, 135; 502/525; 423/593, 594

[56] References Cited

U.S. PATENT DOCUMENTS

| | | | |
|---|---|---|---|
| 4,543,341 | 9/1985 | Barringer et al. | 501/135 X |
| 4,606,906 | 8/1986 | Ritter et al. | 501/136 X |
| 4,636,248 | 1/1987 | Ogata et al. | 423/593 X |
| 4,636,378 | 1/1987 | Pastor et al. | 502/525 X |
| 4,696,810 | 9/1987 | Shirasaki et al. | 423/593 OR |

FOREIGN PATENT DOCUMENTS

| | | |
|---|---|---|
| 57-82119 | 5/1982 | Japan . |
| 58-002220 | 1/1983 | Japan . |
| 58-045118 | 3/1983 | Japan . |
| 58-199716 | 11/1983 | Japan . |
| 58-199717 | 11/1983 | Japan . |
| 60-086026 | 5/1985 | Japan . |
| 1174116 | 8/1986 | Japan ................. 423/593 |
| 61-275108 | 12/1986 | Japan . |

OTHER PUBLICATIONS

Smith et al, "Preparation and Characterization of Alkoxy-Derived SrZrO$_3$ and SrTiO$_3$", J. of Am. Cer. Soc., vol. 53, No. 2 (1969) pp. 91–95.

*Primary Examiner*—Mark L. Bell
*Assistant Examiner*—Karl Group
*Attorney, Agent, or Firm*—Stevens, Davis, Miller & Mosher

[57] ABSTRACT

The present invention provides a process for producing powder of complex perovskite type compounds by using metal alkoxides. In the prior art, methods were known for synthesizing crystalline powder of simple perovskite type compounds such as BaTiO$_3$. According to the conventional methods, however, when synthesizing a complex perovskite type compound having two atoms of different valences at the B site of perovskite structure by hydrolyzing metal alkoxides, there could be obtained only amorphous powder, and for crystallizing it, heating to a temperature of around 600° to 800° C. was necessary.

According to the process of this invention, it is possible to synthesize the crystalline complex perovskite type compounds at a low temperature of around 100° C., which is 500° to 700° C. lower than the temperature required in the conventional methods, by adjusting the amount of water added according to the type of the solvent used and controlling the reaction temperature at a specified level or higher.

9 Claims, No Drawings

PROCESS FOR THE PREPARATION OF COMPLEX PEROVSKITE TYPE COMPOUNDS

This application is a continuation of U.S. Pat. Ser. No. 024,630, filed Mar. 11, 1987 abandoned.

BACKGROUND OF THE INVENTION

Attention has been focused recently on the hydrolysis of metal alkoxides as new techniques for producing base powder for ceramics. This method makes use of the peculiar property of the metal alkoxides of the formula $M(OR)_n$ (wherein M is a metal atom of n valences and R is an alkyl group) that they are reacted with water to produce metal oxides or hydroxides and an alcohol according to the following reaction formula:

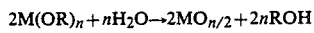

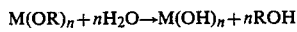

The powder of $TiO_2$ or $SiO_2$ synthesized by this method is particulate, narrow in particle size distribution and also high in purity, so that it has high availability as a powder material for ceramics.

It has been also practiced in the art to synthesize the oxides containing two or more type of metals by the hydrolysis of a mixed solution of two or more types of metal alkoxides. For example, $BaTiO_3$ having a perovskite structure is synthesized by dissolving barium alkoxide and titanium alkoxide in a 1:1 molar ratio in an organic solvent and adding water dropwise to the mixed solution to effectuate the hydrolysis thereof (see Japanese Patent Kokai (Laid-Open) No. 82119/82). According to the conventional method in which $BaCO_3$ and $TiO_2$ are mixed and calcined, a high temperature of around 1,000° C. is required for the synthesis of $BaTiO_3$, but when said metal alkoxides hydrolysis method is employed, it is unnecessitated to use such a high temperature and crystalline $BaTiO_3$ can be obtained by controlling the temperature of the solution at 60° to 70° C. Therefore, the products by this hydrolysis method had many advantages over those by the conventional method, such as no fear of contamination by the impurities at the time of mixing of the materials by a ball mill or such and no possibility of suffering from an increase of particle size or a drop of surface activity which could be caused by a high-temperature heat treatment.

As the oxides containing two or more types of metals and synthesizable as a crystalline powder by said hydrolysis method, there are known the perovskite type compounds such as $SrTiO_3$, $Ba(Ti_{1-x}Zr_x)O_3$, $BaZrO_3$ and $(Ba_{1-x}Sr_x)TiO_3$ and their solid solutions (Japanese Patent Kokai No. 2220/83); ferrite compounds such as $MnFe_2O_4$, $(Mn_{1-x}Zn_x)Fe_2O_4$ and $NiFe_2O_4$ (Japanese Patent Kokai No. 26726/82); germanates such as $SrGeO_3$, $PbGeO_3$ and $ZnGeO_4$ (Japanese Patent Kokai No. 199717/83); $PbWO_4$, $SrAs_2O_6$, etc.

However, when it is tried to synthesize a complex perovskite type compound having a more complicate structure and represented by the general formula $A(B_x,C_y)O_3$ (where A, B and C are the metal atoms of p, q and r valences, respectively, and $q \neq r$, $x+y+1$, and $xq+yr=6-p$) by using said hydrolysis method, there can be synthesized only the amorphous-state powders when the ordinarily used techniques are employed, and for crystallizing them, heating to a temperature of around 500° to 700° C. is required. Thus, in the synthesis of such compounds by the hydrolysis method using the conventional techniques, efficient use was not made of the merit of this hydrolysis method in being capable of low-temperature synthesis of ultrafine particles.

SUMMARY OF THE INVENTION

The present invention provides a process for producing the complex perovskite type compound represented by the chemical formula: $A(B_x, C_y)O_3$ (wherein A, B and C are the metal atoms of p, q and r valences, respectively, and $q \neq r$, $x+y=1$, and $xq+yr=6-p$), characterized in that three types of metal alkoxids: $A(OR_1)_p$, $B(OR_2)_q$ and $C(OR_3)_r$ (wherein $R_1$, $R_2$ and $R_3$ are each an alkyl group), weighed to a, b and c moles, respectively, are mixed with an organic solvent containing z% by volume of a non-polar organic solvent and $(100-z)\%$ by volume of a polar organic solvent, then water or a mixed solution of water and an organic solvent is added thereto so that the amount of water will become $(8-0.065z) \times (2a+2b+5c)$ moles or greater to hydrolyze the metal alkoxides, the reaction mixture being heated to 85° C. or above in the presence of water/organic solvent, at least in the course of or after the hydrolysis reaction, and then the solvent is removed.

As a result of the longtime studies, the present inventors found that in the synthesis of complex perovskite type compounds by the hydrolytic reaction of metal alkoxides, it is possible to synthesize a crystalline powder of complex perovskite type compound, which has been considered impossible with the prior art, by specifying, among the synthesizing conditions, the type of the organic solvent used, the amount of water added and the solution heating temperature as defined above. The present invention disclosed herein is based on this finding. The present inventors consider that said hydrolytic reaction is allowed to provceed in the desired way to produce an amorphous-state precursor by the proper selection of said two reaction conditions, viz. the type of the organic solvent used and the amount of water added, and the occurrence of crystallization of said amorphous compound owes to the proper selection of the temperature at which the reaction solution is heated.

According to the studies by the present inventors, in order to synthesize a complex perovskite type compound from metal alkoxides, it is essential that the two conditions—that the hydrolytic reaction proceeds at a sufficiently high rate, and that the crystallization is induced by heating to a temperature of or above a certain level, at least in the course of or after the hydrolysis reaction—be met at the same time. It is possible to let the hydrolytic reaction proceed at a sufficiently high rate by adding water in large excess or by using a non-polar solvent. The amount of water necessary for forming a crystalline precipitate is decided depending on the amount of the non-polar solvent in the solvent used for the reaction. If the amount of water added is too large, in case the reaction material contains alkali or alkali earth metals whose hydroxides have high water solubility, their metal ions may be eluted out to cause a change of composition. In actual practice, therefore, it is desirable to use a system with as high a content of non-polar solvent as possible (preferably 90 to 100% by volume of non-polar solvent in the whole solvent used) and carry out the hydrolysis with a small amount of water.

The reason why the hydrolytic reaction is accelerated by the use of a non-polar solvent may probably be as follows: the non-polar solvents, although soluble in alcohols, have almost no compatibility with water, so that when water is added to the system, there are partly created in the system the areas where the concentration of water is extremely high, and the hydrolysis advances rapidly in such areas. The promotion of hydrolysis by the increase of the amount of water added is also considered attributable to the increase of water concentration in the system.

However, even if the hydrolysis is allowed to proceed in this way, the formed precipitate will still remain amorphous in the state of precursor if the temperature is below 80° C., and if it is dried as it is at low temperature, there can be obtained no crystalline precipitate, and even if the precipitate is heated after drying, it hardly becomes crystalline. For achieving crystallization, it is necessary to heat the system to a temperature of or above 85° C., at least in the course of or after the hydrolytic reaction.

The term "non-polar solvent" used here refers to the organic solvents with extremely low compatibility with water, such as benzene, toluene, xylene, cumene, ethylbenzene, n-hexane, n-hexyl alcohol and the like, and the term "polar solvent" refers to those organic solvents which have high compatibility with water, such as methanol, ethanol, n-propanol, isopropanol, n-butanol, acetone and the like.

The present invention will hereinafter be described by showing the examples thereof, but it will be obvious that these examples are merely intended to be illustrative and not limitive of the embodiments of the invention.

EXAMPLE 1

Barium isopropoxide, tantalum isopropoxide and zinc isopropoxide were weighed to be 0.012 moles, 0.004 moles and 0.008 moles, respectively, so that the Ba:Zn:Ta ratio would become 3:1:2. These materials were mixed in 120 ml of a xylene/isopropyl alcohol mixed solvent and the mixture was put into a flask. The flask was set in an oil bath and the mixture therein was refluxed under heating at 75° C. in an $N_2$ stream for 2 hours. Then a water/isopropyl alcohol (1:1) mixed solvent was added to the mixture under stirring while changing the amount of water manifoldly, after which the temperature of the oil bath was raised to 120° C. and refluxing of the mixture was continued at this temperature. The resultantly formed precipitate was separated by a centrifuge and, while in a wet state, wrapped up in filter paper. It was further enshrouded twofold in parchment paper to retard escape of vapor and then dried in a dryer set at 120° C. to form powder. As a result of these operations, the vapor pressure becomes higher than 1 atm., and even in the reaction system with a boiling point below 85° C., the temperature of the sample became higher than 85° C. before it was perfectly dried. The perfectly dried powders were subjected to X-ray diffractometry, the results of which are shown in Table 1.

TABLE 1

| | X-ray diffraction of the products Ratio of propyl alcohol, vol % | | | | | | |
|---|---|---|---|---|---|---|---|
| | 0 | 5 | 10 | 30 | 50 | 75 | 100 |
| Amount | 0.072 | Am | Am | Am | Am | Am | Am | Am |
| of | 0.108 | P.Cr | Am | Am | Am | Am | Am | Am |
| water | 0.144 | Cr | P.Cr | Am | Am | Am | Am | Am |
| added | 0.216 | G.Cr | Cr | P.Cr | Am | Am | Am | Am |
| (mol) | 0.288 | G.Cr | Cr | Cr | P.Cr | Am | Am | Am |
| | 0.428 | G.Cr | G.Cr | Cr | P.Cr | P.Cr | Am | Am |

TABLE 1-continued

| | X-ray diffraction of the products Ratio of propyl alcohol, vol % | | | | | | |
|---|---|---|---|---|---|---|---|
| | 0 | 5 | 10 | 30 | 50 | 75 | 100 |
| 0.567 | P.Cr | Cr | Cr | Cr | P.Cr | P.Cr | P.Cr |
| 0.720 | P.Cr | P.Cr | P.Cr | P.Cr | Cr | P.Cr | P.Cr |
| 0.864 | P.Cr | P.Cr | P.Cr | P.Cr | P.Cr | Cr | Cr |
| 3.6 | P.Cr | P.Cr | P.Cr | P.Cr | P.Cr | P.Cr | P.Cr |

Am: amorphous;
Cr: crystallinity to medium degree;
P.Cr: low crystallinity;
G.Cr: high crystallinity As seen from Table 1, in case xylene, a non-polar organic solvent, alone was used as solvent, the crystal phase of $Ba(Zn_{\frac{1}{3}}Ta_{\frac{2}{3}})O_3$ began to form with additional of only 0.108 moles of water, or merely 1.5 or so times the amount of water necessary for barium isopropoxide, zinc isopropoxide and tantalum isopropoxide to react with all amount of water added and hydrolyze wholly into hydroxides. However, when the amount of xylene was decreased while proportionally increasing isopropyl alcohol which is a polar organic solvent, the amount of water required for forming the crystal phase increased accordingly, and when the ratio of isopropyl alcohol became 100%, addition of water in an amount of 0.576 moles, or more than 8 times the amount of water necessary for the hydrolysis of said metal alkoxides, was required for forming the crystal phase. Whichever the type of solvent used is, the crystallinity of the formed precipitate lowers when the amount of water added become excessive. This is probably because $Ba(OH)_2$, the hydrolyzate of barium isopropoxide, is dissolved in excess water.

EXAMPLE 2

Barium isopropoxide, tantalum ethoxide and zinc n-propoxide were weighed to be 0.006 moles, 0.002 moles and 0.004 moles, respectively, so that the Be:Zn:Ta ratio would become 3:1:2. These materials were mixed in 120 ml of xylene and refluxed under heating at 65° C. in an $N_2$ stream for 2 hours. Then 0.108 moles of water was added thereto under stirring, and the mixture was further refluxed under heating at 65° C. for one hour. A part of the produced precipitate was sampled out and subjected to X-ray diffraction in a wet state. It was amorphous. So, the reaction temperature was further raised, and reflux was carried out at 80° C., 85° C., 90° C. and 105° C. for 2 hours and the synthesized samples were centrifuged to separate the solvent and then subjected to X-ray diffraction in a wet state. As a result, the sample obtained after reaction at 80° C. still had the amorphous phase. In the case of the sample obtained after 85° C. reaction, its diffraction pattern showed a peak, though very broad, due to the crystal phase of $Ba(zn_{\frac{1}{3}}Ta_{\frac{2}{3}})O_3$. Crystal phase was produced in the samples dried at 90° C. and above. The particle size of the sample dried at 105° C. was measured by the BET method and X-ray diffractometry. It was approximately 0.04 microns.

EXAMPLE 3

Barium isopropoxide, zinc isopropoxide and niobium isopropoxide were weighed to be 0.012 moles, 0.004 moles and 0.008 moles, respectively, so that the Ba:Zn:Nb molar ratio would become 3:1:2. These materials were mixed in 120 ml of mixed solutions of xylene and isopropyl alcohol of various mixing ratios, and each mixture was put into a flask. The flask was set in an oil bath and the mixture therein was refluxed under heating at 75° C. in an $N_2$ stream for 2 hours. Then a 1:1 mixed solution of water and isopropanol was added thereto under stirring by changing the amount of water manifoldly, after which the oil bath temperature was raised to 120° C. and reflux was continued under this condition. The resultantly formed precipitate was separated by a centrifuge, then wrapped up in a wet state in filter paper, further wrapped twofold in parchment paper to make vapor hard to escape and dried in a dryer set at 120° C. to form powder. As a result of these operations, the vapor pressure became higher than 1 atm., and even in the reaction system with a boiling point below 85° C., the temperature of the sample became higher than 85° C. before it was perfectly dried. Examinations of the perfectly dried powders by X-ray difraction gave the results shown in Table 2.

TABLE 2

| | | \multicolumn{7}{c|}{X-ray diffraction of the products} |
|---|---|---|---|---|---|---|---|---|
| | | Ratio of propyl alcohol, vo. % | | | | | | |
| | | 0 | 5 | 10 | 30 | 50 | 75 | 100 |
| Amount | 0.072 | Am | Am | Am | Am | Am | Am | Am |
| of | 0.108 | P.Cr | Am | Am | Am | Am | Am | Am |
| water | 0.144 | P.Cr | P.Cr | Am. | Am | Am | Am | Am |
| added | 0.216 | Cr | P.Cr | P.Cr | Am | Am | Am | Am |
| (moles) | 0.288 | Cr | Cr | P.Cr | P.Cr | Am | Am | Am |
| | 0.428 | Cr | Cr | P.Cr | P.Cr | P.Cr | Am | Am |
| | 0.576 | P.Cr | Cr | P.Cr | P.Cr | P.Cr | P.Cr | P.Cr |
| | 0.720 | P.Cr | P.Cr | P.Cr | P.Cr | P.Cr | P.Cr | P.Cr |
| | 0.864 | P.Cr | P.Cr | P.Cr | P.Cr | P.Cr | P.Cr | P.Cr |
| | 3.6 | P.Cr | P.Cr | P.Cr | P.Cr | P.Cr | P.Cr | P.Cr |

Am: amorphous;
Cr: crystalline;
P.Cr: low crystallinity.

As seen from Table 2, in case xylene, a non-polar organic solvent, alone was used as solvent, the crystal phase of $Ba(Zn_{\frac{1}{3}}Nb_{\frac{2}{3}})O_3$ began to form with addition of only 9.198 moles of wate, or 2.5 or more times the amount of water necessary for barium isopropoxide, zinc isopropoxide and niobium isopropoxide to react with all amount of water added and hydrolyze wholly into hydroxides. However, when the amount of xylene was decreased while proportionally increasing the amount of isopropyl alcohol which is a polar organic solvent, the amount of water required for forming the crystal phase accordingly, and when the ratio of isopropyl alcohol became 100%, addition of water in an amount of 0.576 moles, or more than 8 times the amount necessary for the hydrolysis of said metal alkoxides, was required for forming the crystal phase. Whichever the type of solvent used is, the crystallinity of the produced precipitate loawers when an excess amount of water is added. This is probably because $Ba(OH)_2$, the hydrolyzate of barium isopropoxide, is dissolved in excess water.

EXAMPLE 4

Barium isopropoxide, zinc n-propoxide and niobium ethoxide were weighed to be 0.006 moles, 0.002 moles and 0.004 moles, respectively, so that the Ba:Zn:Nb molar ratio would become 3:1:2. These materials were mixed in 120 ml of n-hexanol and refluxed under heating at 65° C. in an $N_2$ stream for 2 hours. Then 0.108 moles of water was added thereto under stirring, and the mixture was further refluxed under heating at 65° C. for one hour. A part of the resulting precipitate was sampled out and subjected in a wet state to X-ray diffraction, which showed the precipitate was amorphous. So, the reaction temperature was further raised, and the mixture was refluxed at 80° C., 85° C., 90° C. and 105° C. for 2 hours and the obtained samples were centrifuged to separate the solvent and subjected in a wet state to X-ray diffraction. The results showed that the sample which had undergone 80° C. reaction was amorphous, while the diffraction pattern of the sample dried at 85° C. exhibited a peak, though very broad, of crystal phase of $Ba(Zn_{\frac{1}{3}}Nb_{\frac{2}{3}})O_3$. Crystal phase was seen produced in the samples dried at 90° C. and 105° C.

EXAMPLE 5

Stontium isopropoxide, magnesium isopropoxide and niobium isopropoxide were weighed to be 0.012 moles, 0.004 moles and 0.006 moles, respectively, so that the Sr:Mg:Nb molar ratio would become 3:1:2. These materials were mixed in 120 ml of mixed solutions of xylene and isopropyl alcohol of various ratios, and each mixture was put into a flask. The flask was set in an oil bath and the mixture therein was refluxed under heating at 75° C. in an $N_2$ stream for 2 hours. Then a 1:1 mixed solution of water and isopropyl alcohol was added thereto under stirring while changing the amount of water manifoldly, after which the oil bath temperature was raised to 120° C. and the mixture was further refluxed at this temperature. Each of the resultantly formed precipitate was separated by a centrifuge, wrapped up in a wet state in filter paper, further wrapped twofold in parchment paper to deter escape of vapor and then dried at 120° C. to obtain powder. Owing to these operations, the vapor pressure became higher than 1 atm., and even in the reaction system with a boiling point below 85° C., the sample temperature became higher than 85° C. before it was perfectly dried. The perfectly dried powders were examined by X-ray diffraction to obtain the results shown in Table 3.

TABLE 3

| | | \multicolumn{7}{c|}{X-ray diffraction of the products} |
|---|---|---|---|---|---|---|---|---|
| | | Ratio of propyl alcohol, vol % | | | | | | |
| | | 0 | 5 | 10 | 30 | 50 | 75 | 100 |
| Amount | 0.072 | Am | Am | Am | Am | Am | Am | Am |
| of | 0.108 | P.Cr | Am | Am | Am | Am | Am | Am |
| water | 0.144 | Cr | Cr | Am | Am | Am | Am | Am |
| added | 0.216 | Cr | Cr | P.Cr | Am | Am | Am | Am |
| (moles) | 0.288 | P.Cr | P.Cr | P.Cr | P.Cr | Am | Am | Am |
| | 0.428 | P.Cr | P.Cr | P.Cr | P.Cr | P.Cr | Am | Am |
| | 0.576 | P.Cr | P.Cr | P.Cr | P.Cr | P.Cr | P.Cr | P.Cr |
| | 0.720 | P.Cr | P.Cr | P.Cr | P.Cr | P.Cr | P.Cr | P.Cr |
| | 0.864 | P.Cr | P.Cr | P.Cr | P.Cr | P.Cr | P.Cr | P.Cr |
| | 3.6 | P.Cr | P.Cr | P.Cr | P.Cr | P.Cr | P.Cr | P.Cr |

Am: amorphous;
Cr: crystalline;
P.Cr: low crystallinity.

As seen from Table 3, in case xylene (a non-polar organic solvent) alone was used as solvent, the crystal phase of $Sr(Mg_{\frac{1}{3}}Nb_{\frac{2}{3}})O_3$ began to form with addition of only 0.108 moles of water, or 1.5 or more times the amount of water necessary for strontium isopropoxide, magnesium isopropoxide and niobium isopropoxide to react with all amount of water added and hydrolyze wholly into hydroxides. However, when the amount of xylene was decreased while proportionally increasing the ratio of isopropyl alcohol which is a polar organic solvent, the amount of water required for forming the crystal phase increased accordingly, and when the ratio of isopropyl alcohol became 100%, addition of water in an amount of 0.576 moles, or more than 8 times the amount necessary for the hydrolysis of said metal alkoxides, was required for forming the crystal phase. Whichever the type of solvent used was, the crystallinity of the produced precipitate lowered when the amount of water added was too large. This is probably because $Sr(OH)_2$, the hydrolyzate of strontium isopropoxide, was dissolved in excess water.

EXAMPLE 6

Strontium isopropoxide, magnesium n-propoxide and niobium ethoxide wedre weighed to be 0.006 moles, 0.002 moles and 0.004 moles, respectively, so that the Sr:Mg:Nb molar ratio would become 3:1:2. These materials were mixed in 120 ml of xylene and refluxed under heating at 65° C. in an $N_2$ stream for 2 hours. Then a 1:4 mixed solution of water and ethanol was added to the refluxed mixture under stirring so that the amount of water become 0.072 moles, and the mixture was further refluxed under heating at 65° C. for one hour. The resultantly formed precipitate was sampled out and subjected in a wet state to X-ray diffraction, which showed the precipitate was amorphous. So, the reaction temperature was further raised, and reflux was carried out at 80° C., 85° C., 90° C. and 105° C. and the synthesized samples were filtered to separate the substantial part of the solvent and then subjected in a wet state to X-ray diffractometry. It was found that the sample dried at 80° C. was amorphous while the sample dried at 85° C. showed a diffraction peak, though very broad, of the crystal phase of $Sr(Mg_{\frac{1}{3}}Nb_{\frac{2}{3}})O_3$. Formation of crystal phase was evident in the samples dried at 90° C. and above.

Here, the reaction conditions are briefly described. The higher the metal alkoxide/organic solvent mixing ratio, the better becomes the crystallinity of the produced precipitate, but a too high mixing ratio leads to difficult handling of the product as the produced precipitate/organic solvent ratio increases. As regards water added, the higher the rate of addition of water, the better becomes the crystallinity of the produced precipitate. In case of diluting water added with a polar organic solvent, it is of course necessary to be attentive to the change of water addition rate, but the effect derived from the incorporation of an organic solvent in the system for the purpose of dilution is smaller than the effect due to the casual presence of such solvent in the system before the hydrolysis, so that the effect by the incorporation of said solvent, if small in amount, may be disregarded. The synthesis can be also achieved by using other methods, such as adding water in the form of vapor or adding a metal alkoxide/organic solvent mixed solution dropwise to water.

Even with a system with a high content of polar organic solvent, it is possible to produce a crystalline precipitate by increasing the amount of water added, but if the amount of water added is too large, in case alkali earth metals or such are contained as metal component, the hydroxides thereof may be dissolved in water because of their high solubility in water, causing a decrease of crystallinity or a compositional deviation. For avoiding this, it is a possible measure to add beforehand such metal alkoxides in a somewhat greater amount than the essential compositional requirement, but since such measure makes it more difficult to control the reaction, it is desirable to use a system with as high a content of non-polar organic solvent as possible and carry out the hydrolysis with a small amount of water.

What is claimed is:

1. A process for preparing a crystalline complex perovskite type compound, represented by the chemical formula $A(B_{\frac{1}{3}}C_{\frac{2}{3}})O_3$, wherein A is a metal selected from the group consisting of Ba and Sr; B is a metal selected from the group consisting of Zn and Mg; and C is a metal selected from the group consisting of Nb and Ta; respectively, which comprises weighing out three types of metal alkoxides represented by the formulae $A(OR^1)_2$, $B(OR^2)_2$ and $C(OR^3)_5$, wherein $R^1$, $R^2$ and $R^3$ are each an alkyl group, so that their amounts will be a moles, b moles and c moles, respectively, mixing them with an organic solvent containing z% by volume of a non-polar organic solvent and $(100-z)\%$ by volume of a polar solvent, wherein $0 < z < 100$, adding thereto water or a mixed solution of water and an organic solvent so that the amount of water will become $(8-0.065z) \times (2a+2b+5c)$ moles or greater to hydrolyze the metal alkoxides, heating the hydrolyzate in the presence of the water/organic solvent at a temperature of 85° C. or higher, at least in the course of or after the hydrolysis reaction, and then removing the solvent to obtain the crystalline compound.

2. The process according to claim 1, where the non-polar organic solvents used is selected from the group consisting of benzene, toluene, xylene, cumene, e thylbenzene, hexane, pentanol, hexanol and heptanol.

3. The process according to claim 1, wherein the polar organic solvent used is selected from the group consisting of methanol, ethanol, propanol and butanol.

4. The process according to claim 1, wherein the polar and non-polar organic solvents used are those having boiling points below 85° C., and the heating after addition of water is carried out at the boiling point or below of said organic solvents under 1 atmosphere.

5. The process according to claim 1, wherein the polar and non-polar organic solvents used are those having boiling points below 85° C. and the heating after addition of water is carried out under a pressure of 1 atm. or higher to make the temperature of the system 85° C. or higher.

6. The process according to claim 1, wherein when water is added, the water added is diluted 1 time or more with a polar organic solvent.

7. The process according to claim 1, wherein the course of heating before and after addition of water, evaporation of the solvent is prevented by using a reflux condenser.

8. The process according to claim 1, wherein the removing of the solvent is accomplished by filtration or centrifuging.

9. The process according to claim 1, wherein the heating at the time of reaction is effected by a water bath, oil bath or electric heater.

* * * * *